United States Patent

[11] 3,549,947

| [72] | Inventors | Walter Parfomak |
| | | Wallington, N.J.; |
| | | Robert J. Molnar, New York, N.Y.; John Aitken, Hasbrouck Heights, N.J. |
| [21] | Appl. No. | 736,106 |
| [22] | Filed | June 11, 1968 |
| [45] | Patented | Dec. 22, 1970 |
| [73] | Assignee | The Bendix Corporation |
| | | a corporation of Delaware |

[54] METHOD AND MEANS FOR REDUCING POWER CONSUMPTION IN AN ALTERNATING CURRENT SERVO MOTOR SYSTEM DURING NULL SIGNAL OPERATING CONDITIONS
19 Claims, 5 Drawing Figs.

| [52] | U.S. Cl. | 318/681, 318/207 |
| [51] | Int. Cl. | G05b 5/01 |
| [50] | Field of Search | 318/20.835, 207 |

[56] References Cited
UNITED STATES PATENTS

| 3,259,825 | 7/1966 | James | 318/30X |
| 3,327,186 | 6/1967 | Gregory, Jr. et al. | 318/28 |
| 3,430,117 | 2/1969 | Sennhenn | 318/28X |

*Primary Examiner*—Benjamin Dobeck
*Attorney*—Herbert L. Davis and Plante, Hartz Smith and Thompson ABSTRACT: A method and means for reducing power consumption significantly in an alternating current servomotor system during null signal operating conditions, the system being of a type including a two-phase servomotor having a controlled phase winding and a fixed phase winding, together with an input signal means and a followup signal means, each of which may be some type of alternating current transducer. The method and means for reducing the power consumption includes a means for detecting the signal voltage across the control phase winding of the servomotor, together with means for regulating energization of the fixed phase winding, and means operatively connecting the voltage sensing means to the regulating means so as to significantly reduce the fixed phase energizing current at a null signal condition without affecting the system accuracy or response. Thus as the servomotor is slewing at maximum speed, the fixed phase winding of the motor is excited with maximum alternating current, while as the alternating current signal voltage applied across the control phase winding of the motor approaches a null signal condition the excitation current applied to the fixed phase winding of the motor is gradually decreased until it reaches a minimum value of, for example, one-half the maximum excitation. In the example given, since the minimum excitation current would in effect be equal to one-half the rated voltage, the motor power at the null signal condition would be one-quarter the rated power. Moreover, in order to maintain the servo sensitivity and accuracy at or around the null signal condition the gain of the signal amplifier is effectively doubled.

INVENTORS
WALTER PARFOMAK
ROBERT J. MOLNAR
JOHN AITKEN
BY Herbert L. Davis
ATTORNEY

TYPICAL WAVESHAPES ACROSS FIXED PHASE WINDING OF A.C. SERVO MOTOR

MOTOR AT NULL

MOTOR NEAR NULL

MOTOR AT MAXIMUM SLEW RATE

METHOD AND MEANS FOR REDUCING POWER CONSUMPTION IN AN ALTERNATING CURRENT SERVO MOTOR SYSTEM DURING NULL SIGNAL OPERATING CONDITIONS

CROSS-REFERENCE TO RELATED APPLICATIONS

The present invention relates to improvements in a two-phase servomotor control system of a type such as disclosed and claimed in a copending application Ser. No. 651,579 filed Jul. 6, 1967 now U.S. Pat. No. 3,510,740 by Frederick B. Sylvander and Walter Parfomak and assigned to The Bendix Corporation assignee of the present invention. In the copending application Ser. No. 651,579, there is disclosed a quadrature rejection method and means in which there is provided detection of the amount of quadrature voltage at the control winding of the two-phase servomotor, that is a voltage of fundamental signal frequency which remains when a followup transducer is turned to a position or at a velocity which gives the minimum null at the fundamental frequency; and in response to the amount of the detected quadrature voltage, a source of quadrature correction voltage is so controlled thereby as to feedback from the quadrature correction voltage source into the main signal chain an electrical feedback quadrature correction voltage which is of such a polarity as to buck out the sensed quadrature voltage present at the control winding of the two-phase servomotor.

In distinction, in the present invention, a variable phase control voltage applied across the control winding of the servomotor is sensed and in response thereto a source of alternating current is so controlled as to effect a control of the energizing alternating current applied across the fixed phase winding of the servomotor proportional to the sensed control voltage at the control winding and thereby effectively reduce the power consumption of the servomotor at or about a null signal condition without effecting the system accuracy or response sensitivity of the servomotor control system.

BACKGROUND OF THE INVENTION

1. Field of the Invention

The present invention relates to a method and means for reducing power consumption in an alternating current servomotor system during null signal operating conditions and to the field of servomotor control systems of a type such as disclosed and claimed in a U.S. Pat. No. 3,103,615, granted Sept. 10, 1963 to Joseph O. Vitale and assigned to The Bendix Corporation, assignee of the present invention. Such a servomotor control system may be of a type having an input signal means and a followup signal means, each of which may be some type of alternating current transducer to effect a controlling error signal as described in the aforenoted U.S. Pat. No. 3,103,615.

A major problem in such alternating current servocontrol systems arises due to an excessive power consumption by the alternating current servomotor at or about a null signal condition with a resultant increase in temperature and decrease in reliability of the electronic components of the control system.

This problem has become even more acute in recent years due to the greater crowding of more electronic components into smaller spaces. A servomotor control system of the present invention provides a solution to the problem by proportionally reducing the motor power consumption at or about a null error signal condition by 75 percent or more in effectively reducing the energizing alternating current applied at the fixed phase winding of the two-phase servomotor as the error signal applied at the control phase winding of the motor is proportionally reduced as it approaches the null condition.

2. Description of the Prior Art

Heretofore, silicon controlled rectifiers have been utilized to drive the fixed phase of a two-phase alternating current servomotor, as shown, for example, in a U.S. Pat. No. 3,109,971 granted Nov. 5, 1963 to Hubert G. DeVries and Jack D. Welsh in which there is disclosed an amplifier for a two-phased servomotor using silicon controlled rectifiers to drive both of the phase windings of the servomotor, in an arrangement in which the silicon controlled rectifiers are driven by a multistage amplifier which amplifies an error signal to operate the motor providing an on-off control. Such control in addition to providing a greatly more complex arrangement does not afford the accuracy and sensitivity of control at or about the null signal condition effected by the proportional control of the present invention.

Further, in a U.S. Pat. No. 3,237,070 granted Feb. 22, 1966 to Yoji Inaba and Ken Shiragaki, there is disclosed another arrangement of silicon controlled rectifiers to drive both phases of a two-phase servomotor in which the silicon controlled rectifiers are in turn driven by a pair of transistors to also effect an on-off control of both phase windings which in no wise suggests the proportional control of the fixed phase winding as in the present invention or the simplicity of the present invention to effect greater accuracy and sensitivity at or about the null error signal condition.

Similarly, in a U.S. Pat. No. 3,181,046 granted Apr. 27, 1965 to John S. Sutton, there is shown a two-phase servomotor driven by a silicon controlled rectifier power control unit in which an error signal is developed and used to switch the silicon controlled rectifiers so as to provide power to both of the phase windings of the motor in a different and much more complex arrangement from that of the present invention. Moreover, not only is the servomotor control system of the U.S. Pat. No. 3,181,046 much more complex than that of the present invention, but the mode of operation thereof is entirely different and there is no suggestion therein of a control of the alternating energizing current applied at the fixed phase winding of the servomotor in response and proportional to a sensed error signal voltage at or about the null signal condition and through which there is effected greater accuracy and sensitivity of control in the present invention and a significant reduction in the power consumption in the alternating current servomotor system of the present invention.

A U.S. Pat. No. 3,171,073 granted Feb. 23, 1965 to William L. Adams discloses another silicon controlled rectifier device for reducing the effect of heat at the null condition of operation of the servomotor, but here again both phases of the motor are controlled by a complex arrangement in which there is no suggestion of the proportional control of the energizing current for the fixed phase winding at or about a null error signal condition nor any suggestion of the simplicity of the idea of means for effecting the extreme accuracy and sensitivity of control of the present invention.

Furthermore, a U.S. Pat. No. 3,155,890 granted Nov. 3, 1964 to Benjamin B. Biderman and Charles O. Feigleson discloses a servomotor control system similar in mode of operation to that of the aforenoted prior art patents heretofore discussed, in that in the disclosure of the latter patent there are utilized transistors instead of circuit controlled rectifiers to effect control of both phase windings of the servomotor, but in no wise suggestive of any means for effecting proportional control of the energizing current for the fixed phase winding of the motor at or about the null error signal condition as in the present invention, nor any suggestion of the simplicity of the idea of means of the present invention.

The present invention provides a novel method and distinctly different idea of means for reducing power consumption in an alternating current servomotor system during variable signal operating conditions in the provision of a proportional control of the energizing current applied across the fixed phase winding of the motor in response to the signal voltage applied at the variable phase control winding of the motor so that as the motor approaches a null the excitation across the fixed phase winding of the motor is gradually decreased to, for example, one-half of the maximum excitation voltage, and since such reduction is effectively one-half the rated voltage of the motor, it will be seen that the motor power at null in such case is one-quarter the rated power, while the system accuracy or response at or about the null condition is uneffected.

SUMMARY OF THE INVENTION

The present invention contemplates a novel method and means for using an error signal applied to a control winding of a two phase servomotor to control the excitation and power in the fixed phase winding of the two-phase alternating current servomotor, so as to increase the reliability of the servomotor, as well as the reliability of the electronic components in the control system due to a decrease in the operating temperature of the motor at or about the null error signal condition.

Another object of the invention is to provide a method and means of controlling the excitation of the fixed phase winding of a two-phase alternating current servomotor in response to an error signal applied at a variable phase control winding of the motor so that the power consumption of the motor may be effectively reduced by 75 percent or more at or about null error signal conditions.

Another object of the invention is to provide a power control network for a two-phase servomotor which simplifies complex mechanisms and reduces the number of necessary parts while at the same time raising the percent of durability and certainty of operation in effecting a control of the energizing current for a fixed phase winding of the two-phase motor and which control is proportional to the voltage of an error signal applied across a variable phase control winding of the motor so as to significantly reduce the power consumption of the motor at or about a null signal condition.

Another object of the invention is to provide a novel means and method of utilizing a signal error voltage applied to a variable phase control winding of a two-phase motor so as to effect a proportional control of the excitation current applied to the fixed phase winding of the motor by decreasing the excitation current applied across the fixed phase winding of the motor proportional to and in direct relation to a decrease in the error signal voltage applied at the variable phase control winding of the motor as the motor approaches a null condition.

Another object of the invention is to provide such a power control network for a two-phase servomotor in which the resultant low power required for operation of the control network permits use of miniature component parts in such control network.

Another object of the invention is to provide in such a power control network a novel actuating circuitry for operating a pair of silicon controlled rectifiers so as to effect a distortion of an alternating current applied across a fixed phase winding of the motor to vary the energization thereof in proportion to a controlling signal voltage applied across a variable phase control winding of the motor.

Another object of the invention is to provide in such a power control network a novel actuating circuitry for operating a silicon controlled rectifier means so as to effect a distortion of an alternating current supply of a sinusoidal waveform and passing across a fixed phase winding of the motor at least a predetermined minimum width or segmental portion of each corresponding wave of the alternating current supply and which segmental portion may be increased to a maximum width and proportional to a controlling signal voltage applied across the variable phase control winding of the motor.

Another object of the invention is to provide a novel actuating network for effecting operation of a silicon controlled rectifier means so as to control passage through the rectifier means of an alternating current supply of a sinusoidal waveform in timed relation with the alternating current supply so as to provide a controlled alternating current output of a waveform which may be a distortion of the waveform of the alternating current supply to the extent that at least a predetermined width or minimum segmental portion of each half wave of the supplied alternating current is passed therethrough to the output, and means to increase the width of the segmental portions of the alternating current supply passing through the silicon controlled rectifier means by advancing the time of the controlled passage of the alternating current in relation to the alternating current supply and proportional to an applied controlling signal voltage.

Another object of the invention is to provide in the aforenoted actuating network a pair of silicon controlled rectifiers operative by the network in alternate timed relation with the alternating current supply so as to provide a controlled alternating current output of a waveform which may be a distortion of the waveform of the alternating current supply to the extent that one of said silicon controlled rectifiers is operated by the actuating network so as to pass therethrough predetermined minimum widths or segmental portions of the half waves of the alternating current supply having one polarity sense while the other of said silicon controlled rectifiers is operated by the actuating network so as to pass therethrough like predetermined minimum widths or segmental portions of the half waves of the alternating current supply having an opposite polarity sense, and means to effectively increase the width of the segmental portions of the alternating current supply passing through the silicon controlled rectifiers by advancing the time of the controlled passage of the alternating current in relation to the alternating current supply and proportional to an applied controlling signal voltage.

Another object of the invention is to provide in such an actuating network for operating the silicon controlled rectifiers a control means having a substantially constant threshold potential below which it is nonconductive and above which it is conductive and so arranged as to render the actuating network ineffective to control the silicon controlled rectifiers in response to a signal voltage applied across the variable phase control winding of the motor of a value below the threshold potential and corresponding to a signal voltage at or about the null signal condition, whereupon a supplemental bridge network is effective to control the silicon controlled rectifiers so as to provide a minimum width partial wave excitation current to the fixed phase winding, while upon the signal voltage applied across the control phase of the motor increasing to a value above the threshold potential, such voltage is then effective through the aforenoted control means to apply a voltage to the control rectifiers to advance the firing point of the silicon controlled rectifier so that a larger conduction angle is obtained for increasing the width of the partial excitation wave and the current delivered to the fixed phase winding of the motor proportional to the signal voltage applied to the variable phase control winding of the motor, until the excitation voltage wave is increased to a maximum full wave at which the motor is slewing at maximum speed.

Another object of the invention is to provide in such control means for the actuating network of the silicon controlled rectifiers, a zener diode or zener diodes of a type having a unique reverse current breakdown characteristic which permits conduction in a reverse direction upon the signal voltage exceeding a predetermined critical value and which zener diodes in the reverse or back direction have a substantially constant threshold potential below which it is nonconductive and above which it is conductive so as to provide a relatively small deadband range at or about the null condition of the motor and in which deadband range the proper phase control for firing the silicon controlled rectifiers may be maintained.

Another object of the invention is to provide a power control network for an alternating current two-phase servomotor which inherently dissipates very little power and through the simplicity thereof is readily adapted for utilization with miniature component parts.

These and other objects and advantages of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the drawings, in which corresponding numerals indicate corresponding parts.

DESCRIPTION OF THE INVENTION

Figure 1:
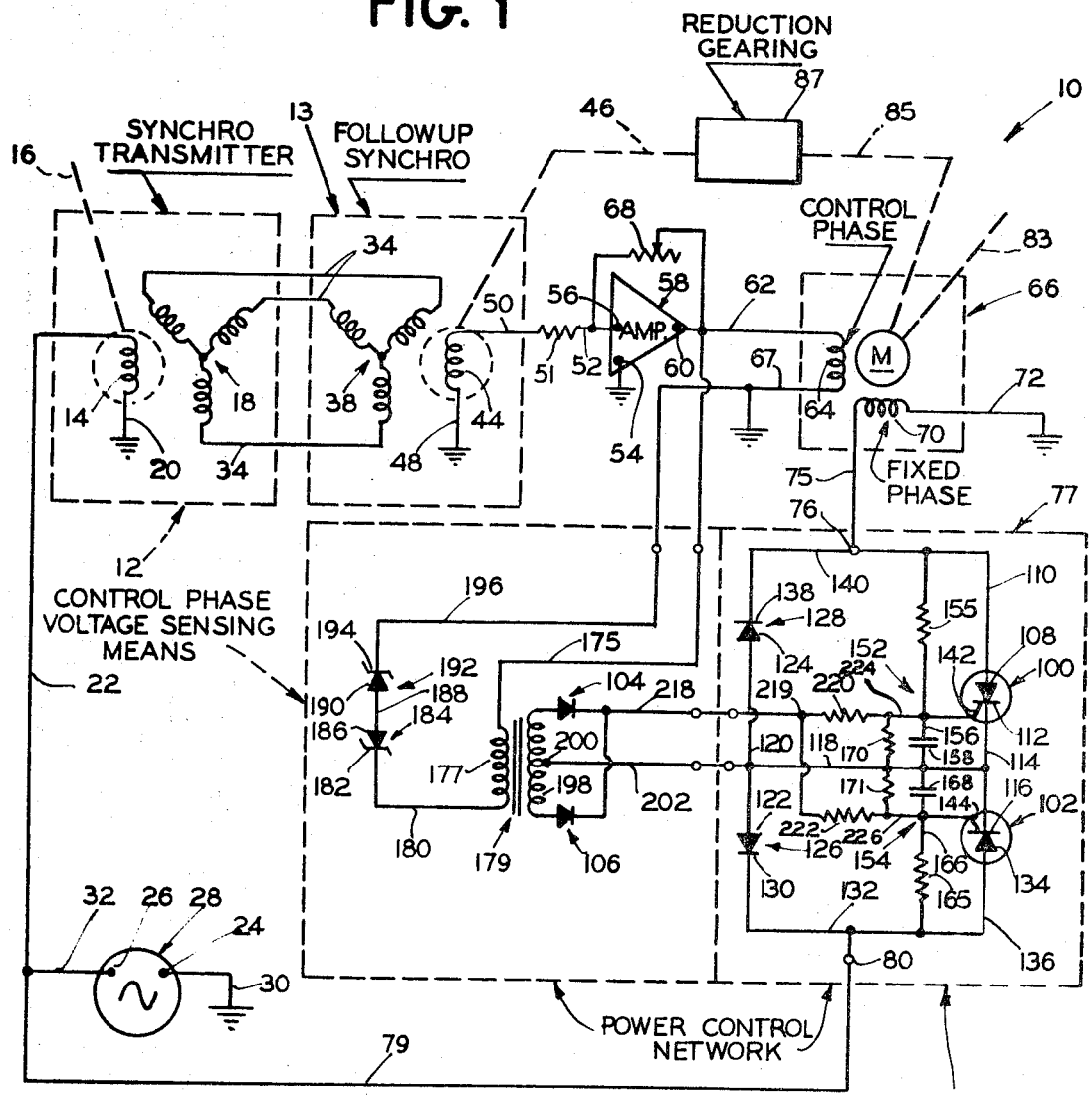
FIG. 1 is a schematic wiring diagram illustrating the present invention as applied to a main signal chain of a positional servomotor control system, and including a power control network embodying the present invention for controlling the energization of a fixed phase winding of a two-phase motor operative in the system in response to a signal voltage applied across a variable phase control winding of the motor.

Referring to the drawing of FIG. 1, a typical servomechanism system to which the present invention may be applied is indicated generally by the numeral 10. Such a servomechanism system 10 may be a positional servomotor control system, as shown by FIG. 1, including an input signal means 12 and a followup signal means 13, each of which may be some type of alternating current transducer.

For example, an input signal means may be a synchro 12 which, as shown in FIG. 1, may include a rotor winding 14, angularly positioned by a control shaft 16 and inductively coupled to a stator winding 18. The rotor winding 14 may be electrically connected by a grounded conductor 20 and a conductor 22 across output terminals 24 and 26 of a constant source of alternating current 28 with the output terminal 24 being connected to ground through a conductor 30 and the output terminal 26 being connected by a conductor 32 to the conductor 22.

The rotor winding 14 of the synchro 12 is angularly positioned in inductive relation to the stator winding 18 which has three-phase winding connected in back to back relation by conductors 34 to three-phase stator windings 38 of a followup signal means or synchro followup transformer 13 having a rotor winding 44.

The followup synchro 13 has the rotor winding 44 inductively coupled to the stator windings 38 and angularly positioned by a shaft 46 relative to the stator windings 38 of the followup synchro 13. The rotor winding 44 is in turn electrically connected through an output grounded conductor 48 to a grounded input-output terminal 54 of amplifier 58 and through a conductor 50, resistor 51 and conductor 52 to an opposite input terminal 56 of the amplifier 58.

The servoamplifier 58 has an output terminal 60 connected through an output conductor 62 to one terminal of a variable phase control winding 64 of a two-phase servomotor 66 having an opposite terminal connected through a conductor 67 to ground and thereby to the opposite grounded input-output terminal 54 of the amplifier 58. A feedback resistor 68 connects the output conductor 62 to the input conductor 52 and is so adjusted that the gain of the amplifier 58 in a conventional manner may be effectively doubled.

A fixed phase winding 70 of the servomotor 66 is also connected at one terminal to ground by a conductor 72 while an opposite terminal is connected through a conductor 75 to a terminal 76 of the power control network indicated generally by the numeral 77. Further, a conductor 79 leads from an opposite terminal 80 of the power control network 77 to the conductor 32 leading from the output terminal 26 of the source of alternating current 28. Energization of the fixed phase winding 70 of the servomotor 66 from the source of alternating current 28 is subject to a controlling action provided by the power control network 77. The fixed phase winding 70 of the servomotor 66 is effectively connected across the output terminals 24 and 26 of the source of alternating current 28 by the power control network 77, while the variable phase control winding 64 of the servomotor 66 is connected to the output conductor 62 and by the conductor 67 to the grounded input-output conductor 54 and thereby across the output of the servoamplifier 58.

The two-phase servomotor 66 is of a conventional variable speed reversible type responsive to the controlling error signal voltage to position a main control shaft 83 and through a followup shaft 85 and reduction gearing 87 to position the followup shaft 46 and thereby the rotor winding 44 to an angular position corresponding to that of the angularly adjusted rotor winding 14 of the input signal means 12 so that a null error signal is effected at the output terminals 60 and 54 of the servoamplifier 58.

The error signal is phase shifted in the amplifier 58 90° to control the direction of rotation of the servomotor 66 so that the phase of the controlling error signal applied to the variable phase control winding 64 of the motor 66 relative to the main current or main field of the line phase applied to the fixed phase winding 70 is so shifted that the same fields form together a rotating field of sufficient magnitude to effect rotation of the servomotor 66 in a direction dependent on the phase direction of the alternating current voltage of the controlling error signal at the input side of the servoamplifier 58. This phase direction will then selectively cause the motor to rotate in a clockwise or counterclockwise direction, as explained in a U.S. Pat. No. 1,586,233 granted May 25, 1926 to Hermann Anschutz-Kaempfe.

A major problem in alternating current servomotor control systems of the present type is the excessive power consumed by the alternating current servomotor at a null condition with a resulting increase in temperature and decrease in reliability of the electronic components of the control system. This problem has become even more acute due to the present trend toward the greater crowding of more electronic components of the control system into smaller spaces. The power control network 77 of the present invention, as hereinafter described, will minimize this problem by reducing the motor power consumption at or about null by 75 percent or more.

Thus, in the power control network 77 of FIG. 1, when the servomotor 66 is slewing at maximum speed the fixed phase winding 70 of the motor is excited with a maximum alternating current while as the motor approaches the null condition, the fixed phase excitation across the winding 70 of the motor is gradually decreased by the action of the power control network 77 and which in the example given may be one-half the maximum excitation voltage. Since this is one-half the rated voltage, the motor power at null is one-quarter the rated power. In order to maintain the servo sensitivity and accuracy, the gain of the servoamplifier 58 is effectively doubled by a suitable adjustment of the feedback resistor 68 of the servoamplifier 58 in a conventional manner. This servoamplifier 58 together with the feedback resistor 68 may be of a conventional microcircuit amplifier type.

The aforenoted power control action is effected by the power control network 77 through the provision of a full wave silicon controlled rectifier and diode bridge combination, including silicon controlled rectifiers or trigistors 100 and 102 and diodes 104 and 106. The silicon controlled rectifier or trigistor 100 has an anode 108 connected by a conductor 110 to the terminal 76 and through the conductor 75 to the fixed phase winding 70 of the servomotor 66. The silicon controlled rectifier 100 also has a cathode 112 connected by a conductor 114 to a cathode element 116 of the silicon controlled rectifier 102 and through a conductor 118 to a conductor 120 connecting anode elements 122 and 124 of diodes 126 and 128. The diode 126 has a cathode element 130 connected by a conductor 132 to the terminal 80 and through conductor 79 to the output terminal 26 of the source of alternating current 28.

Further the silicon controlled rectifier 102 has an anode element 134 connected by a conductor 136 to the terminal 80 and thereby to conductor 79, while the diode 128 has a cathode element 138 connected by a conductor 140 to the terminal 76 and thereby to the conductor 75 leading to the fixed phase winding 70 of the motor 66. Moreover, the silicon controlled rectifiers 100 and 102 have gating terminals 142 and 144, respectively, so that upon a positive control pulse in excess of predetermined value being applied to the gating terminals 142 and 144, as hereinafter explained, the trigistors 100 and 102 will fire and thereby be rendered conductive.

The trigistor 102 upon firing will be conductive of a positive flow of electrical current from the terminal 26 of the source of alternating current 28 through conductor 79, terminal 80, conductor 136, trigistor 102, conductor 114, conductor 118, diode 128, conductor 140 to terminal 76 and thereby through conductor 75 leading to the fixed phase winding 70 and through grounded conductor 72 to the grounded conductor 30 to the opposite then negative terminal 24 of the source of electrical energy 28.

Similarly upon the trigistor 100 firing, it will be rendered conductive of a positive flow of electrical current in an opposite direction from the then positive terminal 24 of the source of alternating current 28 through the grounded conductor 30, and grounded conductor 72 to the fixed phase winding 70 and through conductor 75 and terminal 76, conductor 110, trigistor 100, conductor 114, conductor 118 to conductor 120 and through the diode 126, conductor 132 and conductor 79 to the opposite then negative terminal 26 of the source of electrical energy 28.

At or about the null condition of operation of the motor 66, the phase control for the gating terminals 142 and 144 of the trigistors 100 and 102 are determined by the time constant of resistance-capacitance timing circuits 152 and 154, respectively, of substantially identical values.

The resistance-capacitance timing circuit 152 includes a resistor element 155 connected at one end to the conductor 110 and at an opposite end through a conductor 156 to a plate of a capacitor 158 having an opposite plate connected to the conductor 118, while the resistance-capacitance timing circuit 154 includes a resistor 165 connected at one end to the conductor 136 and at an opposite end through a conductor 166 to a plate of a capacitor 168 having an opposite plate connected to the conductor 118. The gating element 142 of the trigistor 100 is in turn connected to the conductor 156 of the resistance-capacitance timing circuit 152 while the gating element 144 of the trigistor 102 is connected to the conductor 166 of the resistance-capacitance timing circuit 154.

The arrangement is such then that upon an effective positive half wave being applied through the conductor 79 from the terminal 26 of the source of alternating current 28 and through the resistor element 165 to the capacitor 168, the timing circuit 154 will positively charge the plate of the capacitor 168 connected to the conductor 166 while the opposite plate of the capacitor 168 is negatively biased through the conductors 118 and 120, diode 128, conductor 140, terminal 76, conductor 75, fixed phase winding 70, and grounded conductors 72 and 30 leading to the then negative terminal 24 of the source of alternating current 28.

Figure 3A:
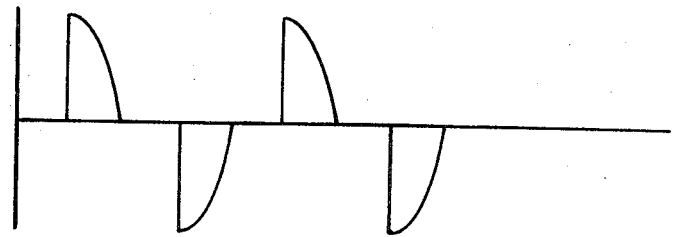
FIG. 3A is a graphical illustration of typical waveshapes of the energizing current applied across a fixed phase winding of the two-phase motor upon signal voltages in a null signal range being applied to the variable phase control winding of the motor.

During the latter half wave, the capacitor 158, connected between the conductors 118 and 156, and the trigistor 100 controlled thereby are reversely biased so that the trigistor 100 is rendered nonconductive. However, the positive charge then applied to the plate of the capacitor 168 connected to conductor 166 and thereby to the gating element 144 of the trigistor 102 increases over a predetermined interval of time determined by the time constant of the timing circuit 154 to a critical value to fire the trigistor 102 at an instant corresponding to a predetermined portion or width of the half wave, as shown by FIG. 3A. The gating element 144 is then so biased as to cause the silicon controlled rectifier 102 to fire and pass the remaining portion of the effective half wave or pulse to cause energization of the fixed phase winding 70 of the motor 66 in such phase sense.

However, upon the succeeding opposite half wave being applied across the output terminals 24 and 26 of the source of alternating current 28 so as to reverse the polarity thereof, the capacitor 168, connected between the conductors 118 and 166, and the trigistor 102 controlled thereby are reversely biased so that the trigistor 102 is then rendered nonconductive during the succeeding opposite half wave. Thus, upon an opposite positive going half wave being applied from the terminal 24 of the source of alternating current 28 through the grounded conductors 30 and 72, fixed phase winding 70, and resistor 155 to the capacitor 158, the timing circuit 152 will positively charge the plate of the capacitor 158 connected to the conductor 156, while the opposite plate of the capacitor 158 is then negatively biased through the conductors 118 and 120, diode 126, and conductors 132 and 79 leading to the then negative terminal 26 of the source of alternating current 28.

The positive charge then applied to the plate of the capacitor 158 connected to conductor 156 and thereby to the gating element 142 of the trigistor 100 increases over a predetermined interval of time determined by the time constant of the timing circuit 152 to a critical value to fire the trigistor 100 at an instant corresponding to a predetermined width or portion of the succeeding half wave, as shown by FIG. 3A, to thereupon so bias the gating element 142 to cause the silicon controlled rectifier 100 to fire and pass the remaining portion of the succeeding effective half wave to cause energization of the fixed phase winding 70 in the succeeding phase sense.

Bleeder resistors 170 and 171 are shunt connected across the respective timing capacitors 158 and 168 so as to permit a faster recycling operation of the trigistors 100 and 102 in that the positively charged plate of the controlling capacitor may be rapidly discharged through the shunting bleeder resistor 170 or 171 to the opposite plate of the controlling capacitor may be rapidly discharged through the shunting bleeder resistor 170 or 171 to the opposite plate of the controlling capacitor upon a cessation of the biasing force of the charging half wave. The alternate discharge of each timing capacitor provided through the shunt connected bleeder resistor is effected at a more rapid rate than would be effected by a discharge solely through the resistors 155 and 165 of the related timing circuits 152 and 154. Also, the bleeder resistors 170 and 171 serve to minimize any interaction between the respective trigistor control circuits.

So long then as the motor 66 is at or about the null condition, the phase control for the silicon controlled rectifiers 100 and 102 is determined by the timing circuits 152 and 154.

This action is subject, however, to a controlling error signal voltage which appears across the variable phase control winding 64 of the motor 66. This controlling voltage is applied through a conductor 175 leading to a primary winding 177 of an induction transformer 179 and through a conductor 180 to a cathode element 182 of a zener diode 184 having an anode element 186 connected in turn through a conductor 188 in back to back relation to an anode element 190 of a zener diode 192 having a cathode element 194 connected through a conductor 196 to the grounded conductor 67 of the control winding 64.

The zener diodes 184 and 192 are of a type having a unique reverse breakdown characteristic which permits conduction in the back direction when voltages exceeding certain values are applied. Moreover, each zener diode has a substantially constant threshold potential below which it is nonconductive and above which it is and a substantially constant impedance when conductive.

The values of the zener diodes 184 and 192 are so selected as to provide a so-called deadband range to maintain the proper phase control for firing the silicon controlled rectifiers 100 and 102, as hereinafter explained. Thus so long as the voltage applied across the control phase winding 64 of the servomotor 66 is within the so-called deadband or servonull voltage range the diodes 184 and 192 are nonconductive. However, when the voltage applied across the control phase winding 64 increases above the so-called null voltage range the zener diodes 184 and 192 become conductive. Moreover, upon the alternating current error signal voltage applied across the control phase winding 64 being in excess of the so-called null range the zener diodes 184 and 192 are effective to permit alternating current energization of the primary winding 177 of the transformer 179.

The induction transformer 179 has a secondary winding 198 inductively coupled to the primary winding 177 and a center tap 200 from which leads a conductor 202 which is in turn connected to the conductor 120 leading to the anode elements 122 and 124 of the diodes 126 and 128, respectively. Also leading from the conductor 120 is a conductor 118 leading to the conductor 114 which is connected to the cathode elements 112 and 116 of the silicon controlled rectifiers 100 and 102.

Opposite ends of the secondary winding 198 of the induction transformer 179 are connected to anode elements of the respective diodes 104 and 106 having cathode elements connected to a conductor 218 leading to ends of resistor elements 220 and 222. The resistor elements 220 and 222 are connected at opposite ends by conductors 224 and 226 to the gating elements 142 and 144, respectively, of the silicon controlled rectifiers 100 and 102.

Figure 3B:
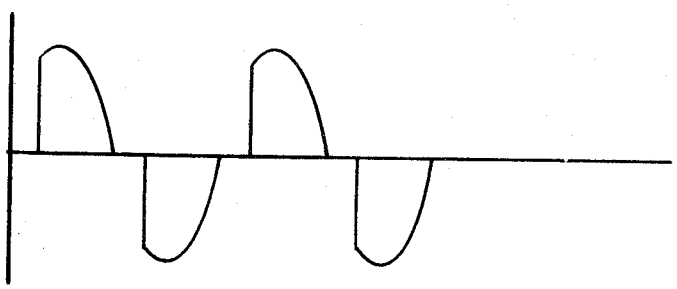
FIG. 3B is a graphical illustration of typical waveshapes of the energizing current applied across the fixed phase winding upon signal voltages intermediate the null signal range and a maximum signal range being applied to the variable phase control winding of the motor.
Figure 3C:
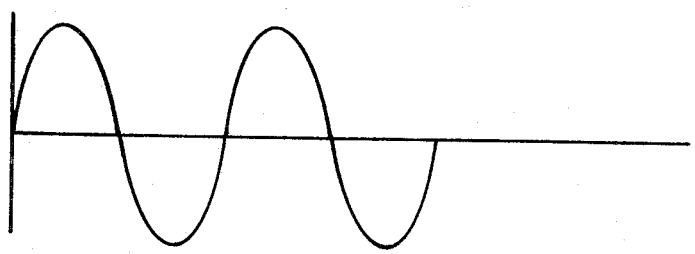
FIG. 3C is a graphical illustration of typical waveshapes of the energizing current applied across the fixed phase winding upon signal voltages in the maximum signal range being applied to the variable phase control winding of the motor.

The arrangement is such that upon a servo error signal being sufficient to cause the signal voltage applied across the variable phase control winding 64 of the motor 66 to increase above the so-called deadband range provided by the zener diodes 184 and 192 this alternating current error signal voltage is then full wave rectified by means of induction transformer 179 and the respective diodes 104 and 106. The resultant direct current control voltage is then fed into the gating elements 142 and 144 of the silicon controlled rectifiers 100 and 102, respectively, by means of the resistors 220 and 222 which act to gradually advance the firing point of the silicon controlled rectifiers with respect to the effective half wave or pulse so that a larger conduction angle is obtained and a greater width or portion of the half wave of electrical power is delivered to the fixed phase winding 70 of the motor 66, as shown graphically by FIGS. 3B and 3C.

Furthermore, upon the servo null voltage across the control phase winding 64 being relatively high due to quadrature, then the zener diodes 184 and 192 through the deadband provided thereby serve to maintain a proper phase control for firing the silicon controlled rectifiers 100 and 102. Also, since the power control network inherently dissipates very little power, the several components thereof may be of a miniaturized type. It may be seen from the foregoing arrangement that when the servomotor 66 is slewing at maximum speed, the fixed phase winding 70 of the motor 66 will be excited with maximum alternating current, while as the motor approaches the null or deadband range, the fixed phase excitation across the motor winding 70 will be gradually decreased until a minimum excitation is effected, for example, one-half the maximum, as shown graphically in FIG. 3A. Since this minimum excitation is one-half the rated voltage, the motor power null will be one-quarter the rated power. Moreover, in order to maintain the servo sensitivity and accuracy the gain of the servoamplifier 58 may be effectively doubled by suitable adjustment of the feedback resistor 68 of the amplifier 58 which may be of a conventional microcircuit amplifier type.

Figure 2:
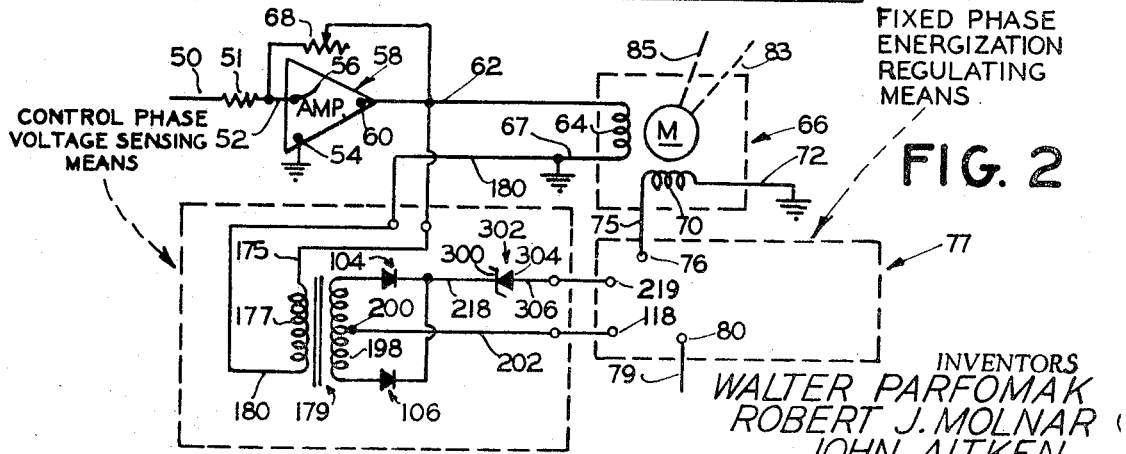
FIG. 2 is a partial schematic wiring diagram embodying in the power control network a modified form of the invention.

In a modified power control network of the type illustrated in FIG. 2, instead of utilizing the back to back connected zener diodes 192 and 184, as shown in the power control network of FIG. 1, the conductor 180 from the primary winding 177 may be directly connected to the grounded conductor 67 leading from one terminal of the variable phase control winding 64 of the two-phase motor 66, while the opposite terminal of the primary winding 177 may be connected through the conductor 175 to the output conductor 62 leading to an opposite terminal of the variable phase control winding 64.

Further in the circuit arrangement of FIG. 2, the conductor 218 leading from the cathode elements of the diodes 104 and 106, respectively, may be connected to a cathode element 300 of a zener diode 302 having an anode element 304 connected by a conductor 306 to the terminal 219 from which lead the respective resistor elements 220 and 222 for the power control network 77, as shown in FIG. 1. The conductor 202 leading from the center tap 200 of the secondary winding 198 is connected into the power control network 77, as shown in detail in FIG. 1.

In the arrangement of FIG. 2, the zener diode 302 is also of the type having a unique reverse breakdown characteristic which permits conduction in the back direction when voltages exceeding certain values are applied. Moreover, the zener diode 302 in the reverse or back direction has a substantially constant threshold potential below which is nonconductive and above which it is conductive and a substantially constant impedance when conductive. The value of the zener diode 302 is so selected as to permit the passage of a DC control voltage upon the same exceeding a predetermined value indicative of a signal error voltage in excess of a predetermined null or deadband range. This deadband range, as provided by the zener diode 302, will, as heretofore explained, maintain the proper phase control for firing the silicon controlled rectifiers 100 and 102.

The power control network, as thus provided in FIGS. 1 and 2, utilized an error signal voltage applied across the variable phase control winding 64 of the servomotor 66 to control the application of electrical power through the fixed phase winding 70 of the two-phase alternating current servomotor 66. Such control serves to effectively increase the reliability of the motor 66 and the electronic components of the power control network 77, as well as effect a decrease in the operating temperatures of the motor 66 under such null conditions.

Moreover, the power consumption of the fixed phase winding of the alternating current servomotor 66 may be reduced by 75 percent or more under such null operating conditions by the simplicity of the power control network in which control of the energizing current for the fixed phase winding 70 of the servomotor 66 is proportional to the error signal applied at the variable phase control winding 64.

Moreover, the power requirements for the operation of the power control network permits utilization of miniature components therein and an activation circuitry for the silicon controlled rectifiers which under the so-called deadband or null operating conditions may be effected solely by the alternating current supplied from a common source while in operating ranges above the so-called deadband or null operating condition of the motor may be directly responsive to the magnitude of the error signal voltage applied across the variable phase control winding 64 of the two-phase motor 66.

There is effective then a novel method and means for reducing power consumption in an alternating current servomotor system during variable signal operating conditions without effecting the system accuracy or response through the simplicity of the power control network and the manner in which it is utilized, as heretofore explained.

While several embodiments of the invention have been illustrated and described, various changes in the form and relative arrangements of the parts, which will now appear obvious to those skilled in the art may be made without departing from the scope of the invention. Reference is, therefore, to be had to the appended claims for a definition of the limits of the invention.

We claim:

1. In a control system of a type including a two-phase motor having a fixed phase winding and a variable phase control winding for controlling rotation of the motor an improvement comprising: means for regulating energization of the fixed phase winding, means for sensing voltage applied across the control winding and including zener diode means, having a substantially constant threshold potential below which the zener diode means is nonconductive and above which threshold potential the zener diode means is conductive of electrical current for controlling the energization of the fixed phase winding, and means operatively connecting the voltage sensing means to the regulating means so as to cause the regulating means to increase energization of the fixed phase winding in response to the sensed voltage applied across the variable phase control winding.

2. The improvement defined by claim 1 in which the zener diode means is connected in an input to the voltage sensing means and across the control winding of the motor, said zener diode means rendering the voltage sensing means ineffective upon the voltage applied across the control winding being below said threshold potential so as to provide a deadband range of minimum energization of the fixed phase winding of the motor, and said zener diode means rendering the voltage sensing means effective to cause the regulating means to increase the energization of the fixed phase winding upon the voltage applied across the control winding being above said threshold potential.

3. The improvement defined by claim 1 in which the zener diode means is connected in an output of the voltage sensing means for rendering effective the means for operatively connecting the voltage sensing means to the regulating means upon the sensed voltage exceeding said threshold potential, and the zener diode means rendering the connecting means ineffective to operatively connect the voltage sensing means to the regulating means upon the sensed voltage being below said threshold potential so as to provide a deadband range of minimum energization of the fixed phase winding of the motor.

4. The improvement defined by claim 1 in which the zener diode means renders the voltage sensing means ineffective upon the sensed voltage being below said threshold potential so as to provide a deadband range of minimum energization of the fixed phase winding of the motor, and said zener diode means rendering the voltage sensing means effective to cause the voltage regulating means to increase the energization of the fixed phase winding upon the voltage applied across the control winding being above said threshold potential.

5. The improvement defined by claim 1 in which the regulating means includes electrically operative control means for applying electrical pulses of variable width to energize the fixed phase winding of the motor, and means responsive to the sensed voltage applied across the variable phase control winding of the motor to cause the control means to vary the width of the energizing pulses in proportion to the sensed voltage applied across the variable phase control winding of the motor.

6. In a control system of a type including a two-phase motor having a fixed phase winding and a variable control winding for control of the motor; an improvement comprising means for sensing voltage applied across the control winding, means for regulating an energization of a fixed phase winding said regulating means including electrically operative control means for applying electrical pulses of variable width to energize the fixed phase winding of the motor, and including a pair of current flow control devices, a pair of capacitors for operating the current flow control devices, each of the pair of current flow control devices being alternately controlled for applying said electrical pulses upon a threshold electrical charge being alternately applied to one and another of said pair of capacitors, each of said capacitors including a charging circuit, means for supplying an alternating current of a sinusoidal waveform, means for operatively connecting said supply means through said current flow control devices to the fixed phase winding of the motor and to said charging circuits so that the sinusoidal waveform of the alternating current from said supply means may render said circuits alternately effective and ineffective to charge said capacitors and thereby cause said capacitors to alternately control said current flow control devices for passing in opposite senses a minimum energization of the fixed phase winding, of the motor, and the means responsive to the sensed voltage applied across the variable phase control winding of the motor being effective to vary the charge applied to the said capacitors so as to cause the current flow control devices to alter the width of the waves of the alternating current passed by said current flow control devices to increase the energization of the fixed phase winding in proportion to the sensed voltage applied across the variable phase control winding of the motor.

7. The combination defined by claim 6 including bleeder resistors shunt connected across said one and said other capacitor of said pair of capacitors so as to provide a path to rapidly discharge each of said capacitors upon the corresponding charging circuit thereof being alternately rendered ineffective by the sinusoidal waveform of the alternating current from said supply means.

8. The combination defined by claim 6 in which the voltage sensing means includes a control element having a substantially constant threshold potential below which the control element is nonconductive and above which threshold potential the control element is conductive of electrical energy, the control element rendering the voltage sensing means ineffective upon the sensed voltage being below said threshold potential so as to provide a deadband range in which the current flow control devices pass the minimum width of the waves of the alternating current to energize the fixed phase winding of the motor, and said control element rendering the voltage sensing means effective to vary the charge applied to said capacitors so as to cause the current flow control devices to alter the width of the waves of the alternating current passed by said current flow control devices to increase the energization of the fixed phase winding in proportion to the sensed voltage upon the voltage applied across the control winding being above said threshold potential.

9. The combination defined by claim 6 in which the charging circuit for each capacitor includes a timing resistor and a control element having a unidirectional current conduction characteristic, means operatively connecting the charging circuits of said capacitors across said supply means in opposite senses, the control element of the charging circuit of one of said capacitors being arranged to permit a current flow only in one direction from said supply means and the control element of the charging circuit of another of said capacitors being arranged to permit a current flow only in an opposite direction from said supply means so that a half wave of the alternating current from said supply means of one electrical polarity periodically effects a charging cycle of said one capacitor while a half wave of the alternating current from said supply means of an opposite electrical polarity periodically effects a succeeding charging cycle of said other capacitor, the alternating current of said sinusoidal waveform thereby acts through the timing resistors and control elements of the respective charging circuits of said one and other capacitors for effecting the alternate control of said pair of current flow control devices for applying said electrical pulses to energize the fixed phase winding of the motor.

10. The combination defined by claim 9 including bleeder resistors shunt connected across said one and said other capacitors of said pair of capacitors so as to provide a path to rapidly discharge each of said capacitors upon the corresponding charging circuit thereof being alternately rendered ineffective by the control element thereof preventing current flow of the then effective half wave of the sinusoidal waveform of the alternating current from said supply means.

11. The combination defined by claim 10 in which the voltage sensing means includes a zener diode means having a substantially constant threshold potential below which the zener diode means is nonconductive and above which threshold potential the zener diode means is conductive of electrical current, the zener diode means rendering the voltage sensing means ineffective upon the sensed voltage being below said threshold potential so as to provide a deadband range in which the current flow control devices pass the minimum width of the waves of the alternating current to energize the fixed phase winding of the motor, and said zener diode means rendering the voltage sensing means effective to vary the charge applied to said capacitors so as to cause the current flow control devices to alter the width of the waves of the alternating current passed by said current flow control devices to increase the energization of the fixed phase winding in proportion to the sensed voltage upon the voltage applied across the control winding being above said threshold potential.

12. A method of energizing a two-phase motor having a fixed phase winding and a variable phase control winding for controlling rotation of the motor; said method comprising the steps of applying to the fixed phase winding a symmetrical alternating current having waves of a variable width, and varying the width of the waves of said alternating current applied to said fixed phase winding proportional to an alternating current error signal of a variable phase and amplitude applied to said control winding.

13. The method defined by claim 12 including the steps of sensing the alternating current error signal applied to said control winding, converting the sensed error signal to a direct current signal of an amplitude proportional to the amplitude of the sensed error signal, and varying the width of the waves of the alternating current applied to said fixed phase winding proportional to the amplitude of the direct current signal.

14. The method defined by claim 12 including the steps of limiting the converting step to an alternating current error signal of an amplitude in excess of a predetermined null error signal range, and varying the width of the waves of the alternating current applied to said fixed phase winding in direct relation to the amplitude of the error signal in excess of said null signal range.

15. The method defined by claim 12 in which the width of the waves of the alternating current applied to the fixed phase winding may be effectively varied between predetermined minimum and maximum widths and in proportion to the amplitude of the alternating current error signal applied to said control winding so as to effectively reduce energization of the fixed phase winding under null error signal conditions.

16. The method defined by claim 12 including the steps of sensing the alternating current error signal applied to said control winding, converting the sensed error signal to a direct current signal of an amplitude proportional to the amplitude of the sensed error signal, limiting the converting step to an alternating current error signal of an amplitude in excess of a predetermined null error signal range, and varying the width of the waves of the alternating current applied to the fixed phase winding between predetermined minimum and maximum widths and proportional to the amplitude of the alternating current error signal in excess of said null signal range and so as to effectively reduce energization of the fixed phase winding upon the amplitude of the alternating current error signal being within said null signal range. waves of the alternating current passed by said current flow control devices to increase the energization of the fixed phase winding in proportion to the sensed voltage applied across the variable phase control winding of the motor.

17. For use with a source of alternating current of a sinusoidal waveform having alternate half waves of opposite electrical polarity; the combination comprising a pair of current flow control devices for periodically conducting alternating current from said source, a pair of capacitors for operating the current flow control devices upon the capacitors being alternately charged to a threshold value, a unidirectional current flow charging circuit, a discharging circuit for each capacitor, the unidirectional current flow charging circuits of both of said capacitors being operatively connected to said source of alternating current in opposite senses and so arranged in relation to the discharging circuits of said capacitors as to permit the half waves of one electrical polarity to render the charging circuit of one of said capacitors and the discharging circuit of another of said capacitors effective while alternately permitting the half waves of an opposite electrical polarity to render the charging circuit of the other of said capacitors and the discharging circuit of said one capacitor effective, each of said charging circuits including means for delaying the charging of said capacitors to said threshold value over an interval of time corresponding to a leading segmental portion of each effective half wave so that the delayed charging of said capacitors to said threshold value and the alternate discharging thereof causes the current flow control devices controlled by said capacitors to alternately conduct distorted half waves having widths corresponding to 18. The combination defined by claim 17 in which the discharging circuit of each capacitor includes bleeder resistors shunt connected across said capacitors to rapidly discharge one of said capacitors upon the unidirectional current flow charging circuit of said one capacitor acting in a sense to prevent the effective half wave from charging said one capacitor through the charging circuit of said one capacitor while the unidirectional current flow charging circuit of the other of said capacitors acts in a sense to permit the half wave to charge said other capacitor.

19. The combination defined by claim 18 including means for applying an auxiliary voltage across each of the capacitors to decrease the delay in the charging of the capacitors to said threshold value and thereby increase the widths of the distorted waves conducted by the current flow control devices.